Dec. 11, 1923.

H. A. RIPPNER 1,477,285

COMBINED STOP LIGHT AND TAIL LAMP

Filed March 14, 1923     2 Sheets-Sheet 1

Inventor
H. A. Rippner
By Hull Brock & West
Attys.

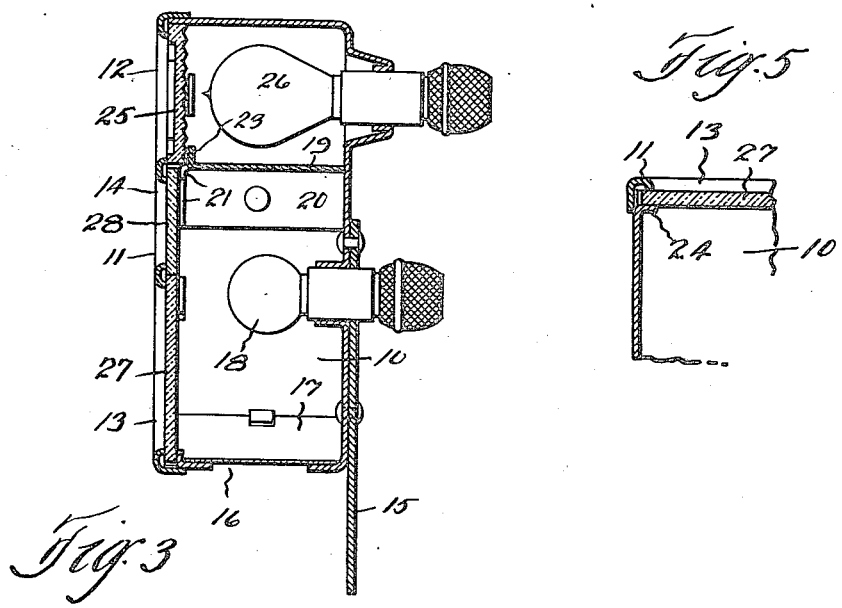
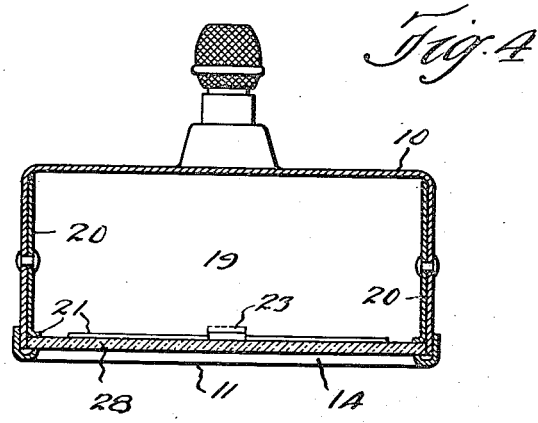

Patented Dec. 11, 1923.

1,477,285

UNITED STATES PATENT OFFICE.

HARRY A. RIPPNER, OF CLEVELAND, OHIO, ASSIGNOR TO BEACON MOTOR LAMP MANUFACTURING COMPANY, OF CLEVELAND, OHIO, A CORPORATION.

COMBINED STOP LIGHT AND TAIL LAMP.

Application filed March 14, 1923. Serial No. 624,883.

*To all whom it may concern:*

Be it known that I, HARRY A. RIPPNER, a citizen of the United States, residing at Cleveland, in the county of Cuyahoga and State of Ohio, have invented a certain new and useful Improvement in Combined Stop Lights and Tail Lamps, of which the following is a full, clear, and exact description, reference being had to the accompanying drawings.

This invention is a combined stop and tail light for use upon motor vehicles and the object of the invention is to provide a simple and efficient device which will provide the usual or regulation tail light and also a stop signal which can be flashed when the speed of the vehicle is checked, and in addition to these features a sign or indicating plate which is constantly illuminated like the tail lamp and which can bear any name or legend desired such as the name of the car or the name of the State or town and which will be visible both by day or night.

With these and certain other objects in view which will become apparent as the description proceeds, the invention is said to reside in the details of construction and in the manner of combining or arranging the several parts of the device, all of which will be fully described hereinafter and set forth in the appended claims.

Figure 1:
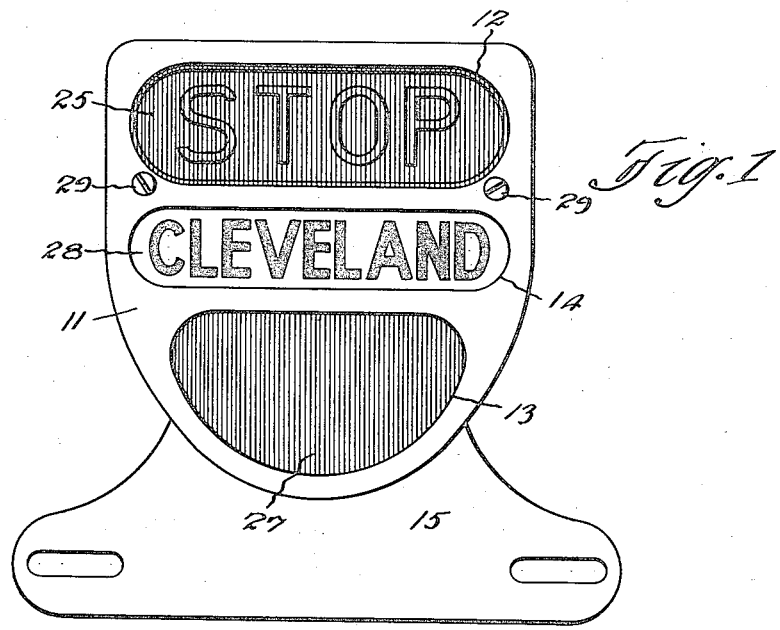
Figure 2:
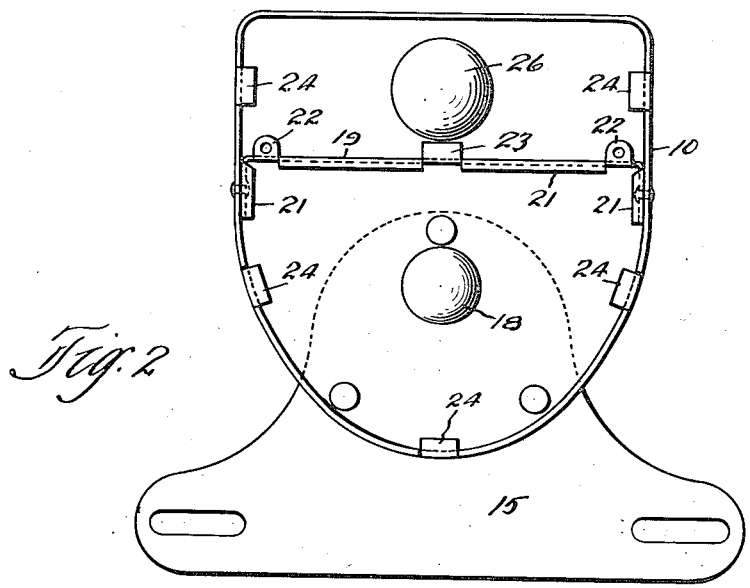

In the drawings forming a part of this specification, Fig. 1 is a face view of a combination stop and tail light constructed in accordance with my invention and Fig. 2 is a similar view with the front of the casing removed; Fig. 3 is a vertical sectional view; Fig. 4 is a horizontal sectional view; and Fig. 5 shows a detail of construction.

In carrying out my invention I employ a sheet metal casing 10 which may be of any preferred or desired shape but in the present instance is shown semi-oval, having a flat top and rounded curved bottom portin and fitting upon the front edge of said casing is a front cover frame 11 made also of sheet metal and having the top opening 12, the bottom opening 13 and the central or intermediate opening 14. A license plate 15 is rigidly attached to the back of the casing for the purpose of carrying the usual license at a point below the casing and it will be noted that the bottom of the casing is formed with an opening 16 which is closed by means of a sheet of celluloid or other transparent material 17 and through which the light from the tail lamp 18 passes for the purpose of illuminating the license plate. The casing is subdivided into two compartments by means of a horizontal partition 19 which is formed with legs 20 at each end for attachment to the sides of the casing and the horizontal portion of the partition and also the depending legs are formed with flanges 21 and in addition the partition is formed with upwardly projecting apertured ears 22 near each end and also an upwardly projecting lug 23 at the center and the sides of the casing are also punched inwardly providing lugs 24 at definite intervals and these lugs 24 are in substantial alignment with the lug 23. The upwardly projecting lug 23 and the upper lugs 24 serve as positioning means for a signal plate 25 which is preferably of red glass having the word "Stop" thereon and this glass may be of any desired construction so that when the lamp 26 is illuminated the word "Stop" will be conspicuously displayed so as to render the same visible either by day or by night and it will of course be understood that the lamp 26 is of higher candle power than the ordinary tail lamp 18. The pane of red glass 27 is arranged in front of the tail lamp 18, the edges thereof resting upon the lower lugs 24 and resting upon the flanges 21 is a glass plate 28 which is preferably of translucent material and is intended to have some word or name placed thereon in any suitable manner and this name or word may be the name of the car to which the lamp is attached or it may be the name of the State or town in which the owner of the car is located.

It will thus be seen that the stop signal plate extends across the front of the upper compartment of the casing and the tail light and name plate extend across the front of the lower compartment of the casing. The front cover frame is then placed in position and screws 29 are passed through the same into the apertured ears 22 thereby securely connecting the front cover plate to the casing and holding the stop signal glass, the tail lamp glass and the name plate glass firmly positioned in front of the tail lamp and signal lamp.

The usual form of socket connections are of course provided in the back of the casing and the casing is attached to the rear of the automobile in the usual manner and the tail lamp is connected as usual with the lighting system so that at night it is constantly illuminated. The signal lamp 26 is provided with a circuit which is connected with either the brake or clutch or both so that as the speed of the car is checked the signal lamp will be illuminated and when this signal lamp is illuminated the word "Stop" is conspicuously displayed and is visible either by day or night. The name plate being of translucent material and preferably white in color with the name or word arranged thereon in some contrasting color is visible also both by day or night.

It will thus be seen that I provide a simple and efficient combination device capable of successfully carrying out all the objects hereinbefore referred to. The edges of the openings 12, 13 and 14 are turned inwardly so as to bind firmly against the outer faces of the glass plates and consequently hold them firmly in position.

Having thus described my invention, what I claim is:

1. A device of the kind described comprising a casing, a partition subdividing said casing into two compartments, the front edges of said partition being flanged and provided with apertured ears and a lug, the edges of the casing also being provided with lugs, a stop signal plate positioned against the lugs of the casing and partition, a name plate positioned against the flanges of the partition and a tail lamp plate positioned against the lugs of the casing and a frame plate secured to the casing and having openings opposite the stop signal plate, name plate and tail lamp plate and means for connecting the frame plate to the casing.

2. A device of the kind described comprising a casing having the edges thereof provided with inwardly projecting lugs, a partition arranged in said casing and subdividing the same into two compartments, said partition having depending legs, the front edges of said partition and legs being flanged, said partition also having an upwardly extending lug and upwardly extending apertured ears, a stop signal plate positioned against the lugs of the casing and the upwardly extending lug of the partition, a name plate positioned against the flanges of the partition and legs, and a tail lamp plate positioned against the inwardly projecting lugs of the casing and a flanged frame plate arranged upon the front of the casing, screws passing through said frame plate and engaging the apertured ears of the partition, said frame plate having openings opposite the stop signal plate, name plate and tail lamp plate.

In testimony whereof, I hereunto affix my signature.

HARRY A. RIPPNER.